US008201716B2

(12) United States Patent
Chastine et al.

(10) Patent No.: US 8,201,716 B2
(45) Date of Patent: Jun. 19, 2012

(54) DISPENSER WITH REPLACEABLE ACTUATORS AND RELATED METHODS

(75) Inventors: Christopher R. Chastine, Lawrenceville, GA (US); John M. Riney, Buford, GA (US); Laurence B. Saidman, Duluth, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 12/712,691

(22) Filed: Feb. 25, 2010

(65) Prior Publication Data

US 2010/0147877 A1 Jun. 17, 2010

Related U.S. Application Data

(63) Continuation of application No. 10/907,514, filed on Apr. 4, 2005, now Pat. No. 7,694,855, which is a continuation-in-part of application No. 10/975,227, filed on Oct. 28, 2004, now abandoned.

(60) Provisional application No. 60/565,161, filed on Apr. 23, 2004.

(51) Int. Cl.

| | |
|---|---|
| ***B67D 3/00*** | (2006.01) |
| ***G01F 11/00*** | (2006.01) |
| ***F16K 31/12*** | (2006.01) |
| ***F16K 1/00*** | (2006.01) |

(52) U.S. Cl. ..... 222/504; 222/333; 222/389; 222/146.2; 251/58; 251/62; 251/231; 137/875

(58) Field of Classification Search .................. 222/504, 222/334, 389, 422, 509, 559, 146.5, 146.2, 222/385, 333; 251/129.2, 238, 58, 31, 26, 251/62, 77, 231; 137/625.44, 625, 65, 875
See application file for complete search history.

(56) References Cited

U.S. PATENT DOCUMENTS

| | | | | | |
|---|---|---|---|---|---|
| 1,189,078 | A | * | 6/1916 | Evans | 251/58 |
| 1,260,246 | A | * | 3/1918 | Point | 251/58 |
| 2,052,246 | A | * | 8/1936 | Ray | 251/129.2 |
| 3,143,131 | A | * | 8/1964 | Spencer | 137/269 |
| 3,971,542 | A | * | 7/1976 | Lee, II | 251/58 |
| 4,653,673 | A | * | 3/1987 | Wagner | 222/309 |

FOREIGN PATENT DOCUMENTS

| | | |
|---|---|---|
| JP | 60174547 A | 9/1985 |
| JP | 03025475 | 2/1991 |
| JP | 2003406817 | 6/2005 |

OTHER PUBLICATIONS

Translation of Office Action issued in related Japanese application No. 2005-124445 dated Jun. 29, 2011.

European Patent Office, European Search Report issued in related European Application No. 10195614.2 dated Mar. 20, 2012.

The State Intellectual Property Office of the People's Republic of China, Second Office Action issued in related Chinese Application No. 201010193874.5 dated Mar. 29, 2012.

* cited by examiner

*Primary Examiner* — Kevin P Shaver
*Assistant Examiner* — Stephanie E Williams
(74) *Attorney, Agent, or Firm* — Wood, Herron & Evans, LLP

(57) ABSTRACT

Dispensers with replaceable actuators and related methods. A representative dispenser includes a sealed fluid chamber with a fluid inlet and a valve seat, a valve member configured to be reciprocally moveable relative to the valve seat, and an actuator interface. The dispenser includes first and second actuators configured to be coupled with the actuator interface for reciprocally moving the valve member. The first actuator is configured to operate by a different motive force than the second actuator. The first actuator can be removed and replaced with the second actuator. The methods involve the ability to replace the first actuator with a second actuator.

3 Claims, 15 Drawing Sheets

DISPENSER WITH REPLACEABLE ACTUATORS AND RELATED METHODS

CROSS-REFERENCE TO RELATED APPLICATIONS

This application is a continuation of application Ser. No. 10/907,514, filed Apr. 4, 2005 (pending), which claims the benefit of U.S. Provisional Application 60/565,161, filed Apr. 23, 2004, and which is a continuation-in-part of U.S. application Ser. No. 10/975,227, filed Oct. 28, 2004 (abandoned), the entire disclosures of all of which are hereby incorporated by reference herein.

FIELD OF THE INVENTION

This invention generally relates to liquid dispensing devices used for a variety of purposes, but particularly useful for viscous liquids such as hot melt adhesives, sealing compounds, paints, etc. Such devices are referred to as fluid control valves or dispensing guns or modules.

BACKGROUND OF THE INVENTION

A typical dispensing device for supplying liquid, such as hot melt adhesive, generally includes a body having a valve stem that opens and closes a dispensing orifice. The valve stem is usually actuated in at least one direction by pressurized air to dispense discrete amounts of pressurized liquid. Either a spring mechanism or pressurized air is used to move the valve stem in an opposite direction against a valve seat. This stops the flow of liquid from the dispensing orifice.

More specifically, devices generally related to the present invention include a liquid passage adjacent the dispensing orifice and an actuator cavity or chamber at an opposite end of the device. The actuator cavity contains a portion of the valve stem which is connected with a piston member and which is also connected with a spring return mechanism, as discussed above. Under sufficient air pressure applied on one side of the piston member, the valve stem is moved in a direction away from the valve seat to discharge liquid. When the air pressure is relieved, the spring mechanism will automatically return the valve stem to a normally closed position against the valve seat. Such spring mechanisms generally include an adjustment to vary the spring compression and thereby vary the amount of air pressure required to open the valve. Adjustment of the spring compression will also adjust the biasing force used to close the valve. These devices also include a stroke adjustment, or the spring compression adjustment also varies the stroke of the valve stem to adjust the flow rate.

Despite the wide success of devices as described above, improvement is desired. For example, a dynamic seal placed generally between the dispenser body and the moving valve stem typically prevents liquid from leaking into the actuator cavity. Dynamic seals are conventionally understood to be seals between two surfaces that move relative to one another. These dynamic seals may press tightly against the valve stem and cause friction and seal wear. The higher friction may place greater demands on the requirements for pressurized air to move the valve stem. On the other hand, selecting a looser dynamic seal could result in inadequate sealing, thus allowing the liquid to bind the piston and pressurized air to enter into the liquid passage, causing undesired dispensing discontinuities. Even with reduced friction, the dynamic seal will wear over time and lose its ability to seal properly.

It would therefore be desirable to provide a dispenser that eliminates or reduces the need for dynamic seals in contact with the pressurized liquid, thus eliminating or reducing problems such as those mentioned above.

SUMMARY OF THE INVENTION

Accordingly, certain embodiments of the present invention relate to a dispenser including an actuating section having a first moveable member and a hydraulic section coupled with the actuating section in a side-by-side configuration and having a second moveable member. The hydraulic section includes an outlet and is adapted to dispense liquid therefrom and the actuating section is adapted to control dispensing of the liquid. The dispenser further includes an actuator assembly operatively coupling the first moveable member with the second moveable member, wherein the first moveable member is operative to move the second moveable member between open and closed positions for respectively starting and stopping flow of liquid from the outlet.

In one exemplary embodiment of the invention, the actuating section is a pneumatic section wherein the first moveable member is configured as a piston that is adapted to move in response to pressurized fluid. The dispenser may further include a solenoid for delivering pressurized fluid to the piston. A biasing member, such as a spring, may be coupled with the piston to bias the piston in a preferred direction. In the exemplary embodiment, the hydraulic section has a second moveable member configured as a needle capable of reciprocating movement within the hydraulic section. The hydraulic section includes an inlet for coupling the hydraulic section with a source of pressurized liquid and an outlet through which the liquid is dispensed. The hydraulic section may also include a biasing element, such as a spring, that biases the needle in a preferred direction.

The actuator assembly includes a pivoting lever arm having a first end coupled with the piston and a second end coupled with the needle. In one aspect of the invention, the second end of the pivoting lever arm couples with the needle at a point located between the inlet and outlet. Coupling the end of the pivoting lever arm with the second moveable member, such as the needle, between the inlet and outlet advantageously reduces or eliminates stagnation points and consequently reduces or eliminates the formation of char and other material buildup within the hydraulic section. The actuator assembly further includes a flexible seal coupled with the pivoting lever arm and adapted to be positioned between the actuating section and the hydraulic section to prevent liquid from leaking into the actuating section. The seal can be a non-diaphragm seal wherein the periphery of the seal is unrestrained and is capable of flexing to accommodate the movement of the pivoting lever arm while retaining a fluid-tight seal. The seal may be further adapted to withstand large hydraulic operating pressures, such as from approximately 80 psi to at least 1,500 psi and other pressure ranges. A bushing support may be provided that couples with the pivoting lever arm and supports the seal. The bushing support is positioned radially inward of the seal's periphery. Furthermore, the actuator assembly may also include a pivoting member, such as a pivoting pin, coupled with the pivoting lever arm and adapted to define a fixed pivot point around which the pivoting lever arm pivots.

Variations of the above-described dispenser are contemplated to be within the scope of the present invention. For instance, in some embodiments of the invention, the actuating section is an electrical section wherein the first moveable member is configured as an armature that is adapted to move in response to an electrical current. The first end of the pivoting lever arm is then coupled with the armature such that movement of the armature moves the second moveable member, such as a needle, between the open and closed positions. In other embodiments of the invention, the second moveable member within the hydraulic section is configured as one or more pads. The pads are adapted for reciprocating movement within the hydraulic section between open and closed positions for respectively starting and stopping flow of liquid from the outlet. Yet other embodiments of the invention include a hydraulic section configured to operate in a snuff-back mode, a three way mode or both.

In another embodiment, a dispenser includes a sealed fluid chamber with a fluid inlet and a valve seat, a valve member configured to be reciprocally moveable relative to the valve seat, and an actuator interface. The dispenser includes first and second actuators configured to be coupled with the actuator interface for reciprocally moving the valve member. The first actuator is configured to operate by a different motive force than the second actuator. The first actuator can be removed and replaced with the second actuator.

In yet another embodiment, a method includes operating a first actuator to reciprocally move a valve member relative to a valve seat, removing the first actuator from an actuator interface of the dispenser, coupling a second actuator with the actuator interface of the dispenser to replace the first actuator, and operating the second actuator to reciprocally move the valve member relative to the valve seat. The first actuator is configured to operate by a different motive force than the second actuator.

These and other objects, advantages and features of the invention will become more readily apparent to those of ordinary skill in the art upon review of the following detailed description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
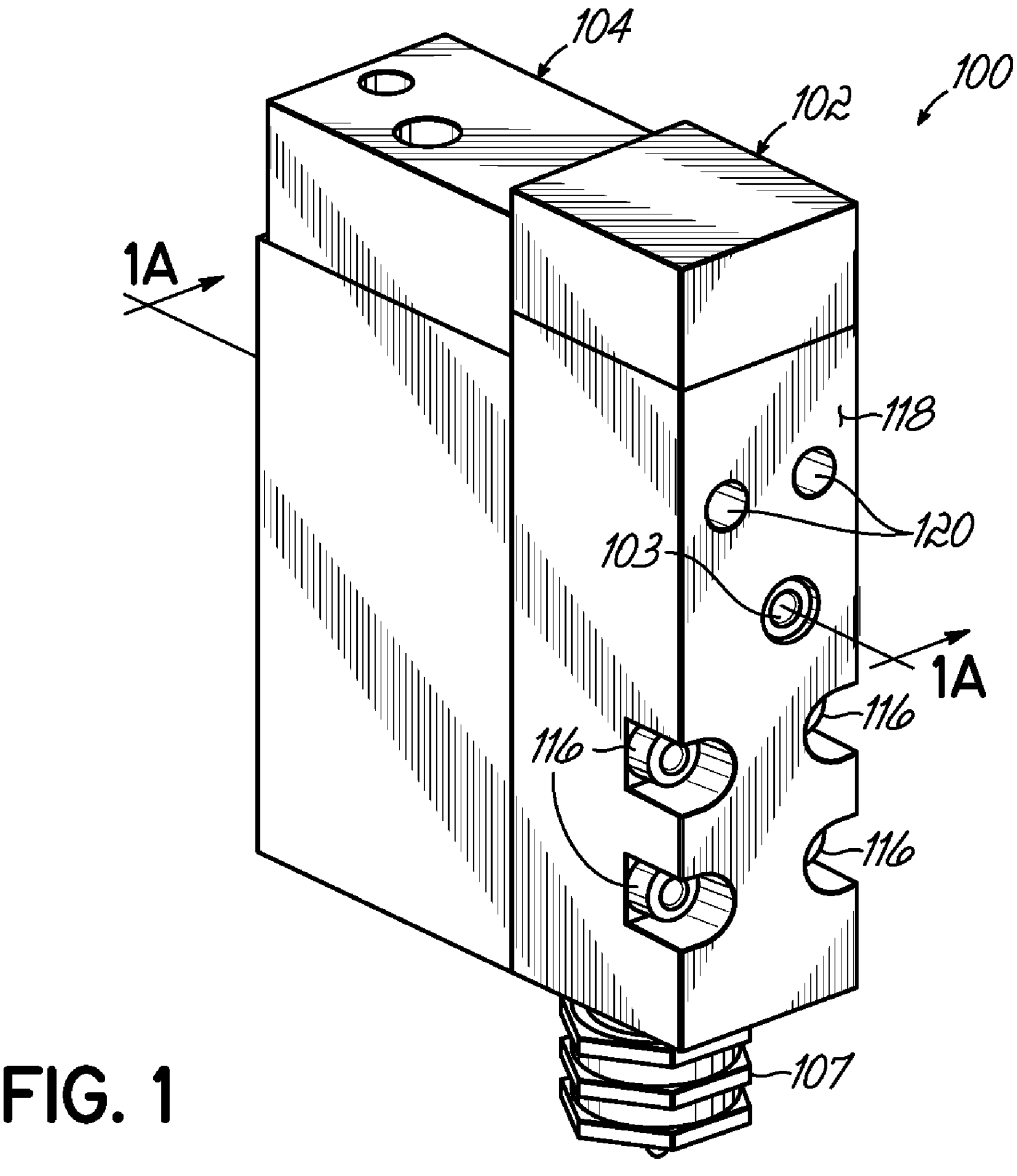
FIG. 1 illustrates a schematic perspective view of a dispenser in which a hydraulic section and an actuating section are arranged side-by-side in accordance with the invention.

FIG. 1 is a schematic depiction of an exemplary dispenser in accordance with the invention. Unlike previous dispensers, the dispenser of the invention includes a hydraulic section 102 and an actuating section 104 arranged in a side-by-side manner instead of in a vertical manner. As the hydraulic section 102 is often coupled with a heated manifold or other heater block, the present side-by-side arrangement allows the actuating section 104 to be thermally isolated from such a heater block. As a result, O-rings and other seals within the actuating section 104 should not be exposed to the same high temperatures as experienced in conventional dispensers. Additionally, other electrical components, such as, for example, solenoids, will not be exposed to high temperatures as well. This permits closer coupling of the solenoid with the actuating section, which improves response time. Overall, the side-by-side arrangement will provide increased reliability and performance over the conventional, vertically-arranged dispensers.

Figure 1A:
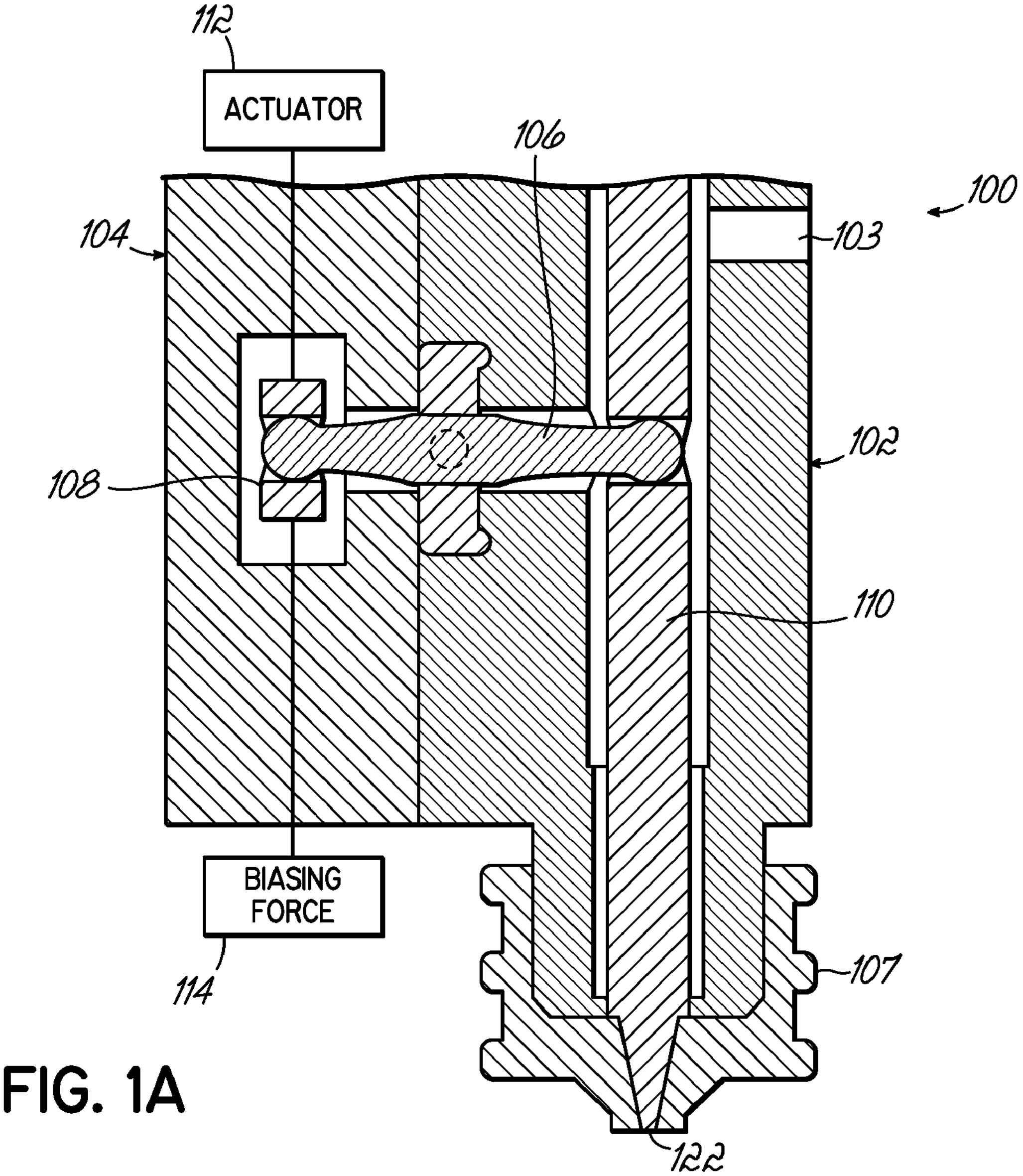
FIG. 1A illustrates a partial sectional view of the dispenser of FIG. 1 generally taken along the line 1A-1A.

As shown in FIG. 1A, an exemplary dispenser in accordance with the invention generally includes a hydraulic section 102, an actuating section 104, and an actuator assembly 106. The hydraulic section 102 receives a pressurized liquid, for example, liquid hot melt adhesive, from an inlet 103 and dispenses the liquid through an outlet, such as nozzle 107. The actuating section 104 includes a first moveable member 108 and the hydraulic section includes a second moveable member 110. The actuator assembly 106 operatively couples the first moveable member 108 with the second moveable member 110 such that the first moveable member 108 is operable to move the second moveable member 110 between open and closed positions for respectively starting and stopping dispensing of the liquid. The first moveable member 108 is coupled with an actuator 112 that is capable of moving the first moveable member 108. A biasing force 114 may be applied to first moveable member 108 to bias the first moveable member in a preferred direction. The actuating section is adapted to control the dispensing of liquid through the hydraulic section 102 by controlling the movement of the first moveable member 108.

The hydraulic section 102 and the actuating section 104 can be coupled together by any variety of methods. For example, in FIG. 1, four bolts 116 are used to connect the actuating section 104 and the hydraulic section 102 together. Furthermore, the hydraulic section 102 includes a face 118 that is coupled with a dispensing manifold (not shown) of a liquid dispensing system. For example, through bolt holes 120 may be used to couple the hydraulic section 102 to the manifold (not shown). When coupled, the orifice 122 cooperates with an outlet port of the manifold so that pressurized liquid (e.g., 500 psi) is received within the hydraulic section 102. As explained in more detail below, this pressurized liquid is dispensed from the nozzle 107 in a precise and accurate manner. In advantageous embodiments, the hydraulic section 102 is constructed from a heat transferable material, including non-interactive metals such as aluminum, brass, or stainless steel while the actuating section 104 may be constructed from a metal or a temperature resistant plastic, including a fluoroplastic.

The following figures and description thereof provide various embodiments of the invention showing different configurations of the hydraulic section 102, actuating section 104 and actuator assembly 106. For instance, as described below, the actuating section 104 may be configured as a pneumatic section, wherein a pressurized fluid controls the movement of a piston or an electrical section, wherein electrical current controls the movement of an armature. Additionally, the hydraulic section 102 may have many different configurations, such as including a needle, ball or one or more pads capable of reciprocating movement within the hydraulic section that cooperates with a valve seat for starting and stopping the dispensing of liquid through the nozzle 107. The hydraulic section 102 may also be configured with a snuff-back feature, a three-way feature or both. Thus although several embodiments of the invention are shown and described herein, the invention is not so limited as those of ordinary skill in the art will recognize other configurations that may be used with the invention.

Figure 2:
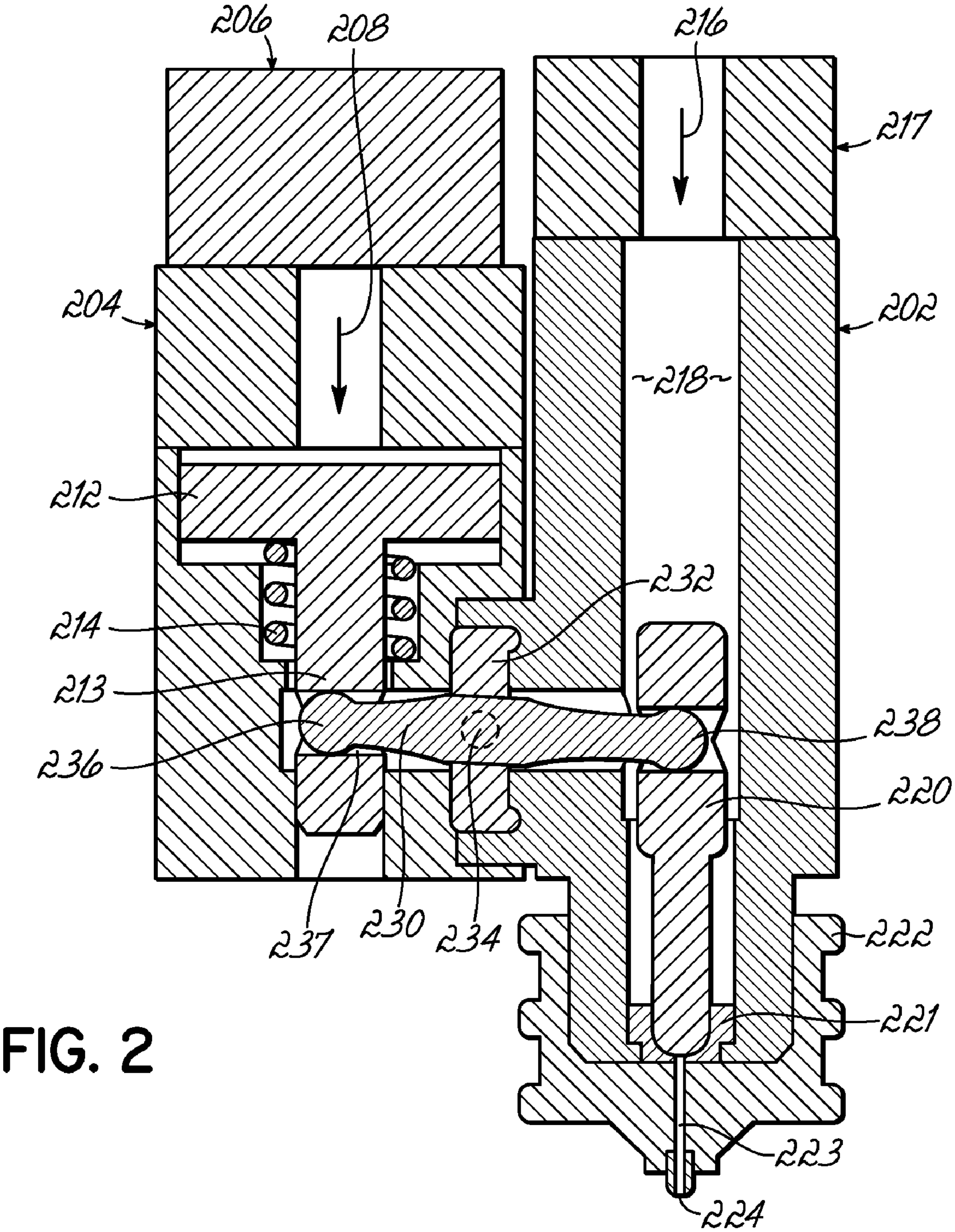
FIG. 2 illustrates a sectional view of an exemplary dispenser having an actuator assembly in accordance with the invention.

FIG. 2 depicts a sectional view of an exemplary dispenser according to an embodiment of the invention. The solenoid 206 and the manifold 217 are shown as simple blocks as their operation is well understood by one of ordinary skill in this field. In particular, the solenoid 206 performs so as to deliver pressurized air 208 in a controlled manner to a piston 212 of the pneumatic section 204. The manifold 217 performs so as to deliver pressurized liquid 216 to the hydraulic section 202. This sectional view does not depict the bolts or other connectors that may be used to secure the hydraulic section 202 with the pneumatic section 204. Neither does it depict the valve guides and stoke adjust mechanisms that are often included within the hydraulic section of a dispenser.

The hydraulic section 202 includes a chamber 218 that receives the pressurized liquid 216. Within the chamber 218 is a needle 220 that is configured to engage a valve seat 221. When the needle 220 engages the valve seat 221, no pressurized liquid travels from the chamber 218 through the passageway 223 and out the orifice 224 of the nozzle 222. However, when the needle 220 is positioned so as not to engage the valve seat 221, then pressurized liquid exits the chamber 218 via the passageway 223. Thus, by controlling the position of the needle 220, the dispensing of pressurized liquid from the orifice 224 can be accurately and precisely controlled. In addition to a needle valve as shown in FIG. 2, a ball and seat may also be used to control dispensing of pressurized liquid.

One of ordinary skill will recognize that a number of alternative hydraulic sections are contemplated in addition to the specific exemplary hydraulic section 202 of FIG. 2. For example, alternative hydraulic sections contemplated within the scope of the present invention may include integrally formed heater blocks or heater elements. Additionally, the exemplary hydraulic sections may be integrally formed with a manifold, or other similar assembly. In addition, the term "needle" is used in a generic sense and is intended to encompass a wide range of movable members having a variety of shapes and contours.

The pneumatic section 204 includes a piston 212 that is biased upwards via a spring 214. In operation, pressurized air 208 is delivered to the piston 212 with sufficient force to overcome the spring 214 and move the piston 212 downward.

The piston 212 of the pneumatic section 204 and the needle 220 of the hydraulic section 202 are operatively coupled together via a pivoting lever arm 230. The arm 230 includes one end 236 that couples to the piston shaft 213. For example, the end 236 may be ball shaped and fit within a through-bore 237 machined into the shaft 213. As an alternative to the through-bore 237, a blind hole may be machined into the shaft to receive the end 236 in a manner in which the end 236 is free to rotate within the blind hole. Similarly, the other end 238 of the arm 230 may couple with the needle 220. The arm 230 pivots around a pivoting point 234 so that downward motion of the piston 212 results in upward motion of the needle 220. Conversely, upward motion of the piston 212 results in downward motion of the needle 220. The pivoting point 234 may be accomplished by a variety of functionally equivalent methods but may, for example, include a pin that passes through the center of the arm 230. The ends of the pin may be supported in a recess or cavity formed in the hydraulic section 202 such that the pin is free to rotate and therefore allow the arm 230 to pivot.

The seal 232 is located between the hydraulic section 202 and the pneumatic section 204 to prevent pressurized liquid 216 from leaking into the pneumatic section 204. Unlike previous dispensers, the seal 232 is not a dynamic seal around a reciprocating shaft. Instead, the seal 232 is a flexible seal around the pivoting lever arm 230 that is able to flex or "rock" as the pivoting lever arm 230 moves. Accordingly, the flexible seal 232 performs better and lasts longer than earlier dynamic seals. Additionally, the seal 232 is not a diaphragm seal that is supported along its outer periphery and restrained from moving along its outer periphery. Instead, the seal 232 is preferably substantially annular with its inside edge surrounding the arm 230 and its outside edge unrestrained yet sealingly engaging the exterior of the hydraulic section 202. In this way, the seal 232 is able to flex along its periphery so as to accommodate pivotal movement of pivoting lever arm 230. Furthermore, as explained in more detail below, seal 232 is supported from the inside of the seal 232 as opposed to being support along the periphery, as is typical in diaphragm seals. In addition to an annular shape, alternative shapes for the seal 232 may be used such as, for example, square or rectangular. As depicted in FIG. 2, the hydraulic section 202 is shaped so as to create a cavity for the seal 232 to sit in. As those of ordinary skill in the art will recognize, however, a cavity may alternately be formed in the actuating section 204. The seal 232 is preferably made from a resilient or flexible material such as, for example, an elastomeric material that is deformable so that when the pneumatic section 204 and the hydraulic section 202 are coupled together, the seal 232 is slightly compressed in the cavity area and provides a seal between the two sections 202 and 204.

Although not explicitly depicted in FIG. 2, the chamber 218 may include an adjustment mechanism for the needle 220 as is known in the art. A needle stroke adjust mechanism typically includes a physical stop within the chamber 218 that limits the amount of travel of the needle 220. Embodiments of the present invention are capable of operating with the wide variety of needle stroke adjust mechanisms that are known in this field.

Figure 3:
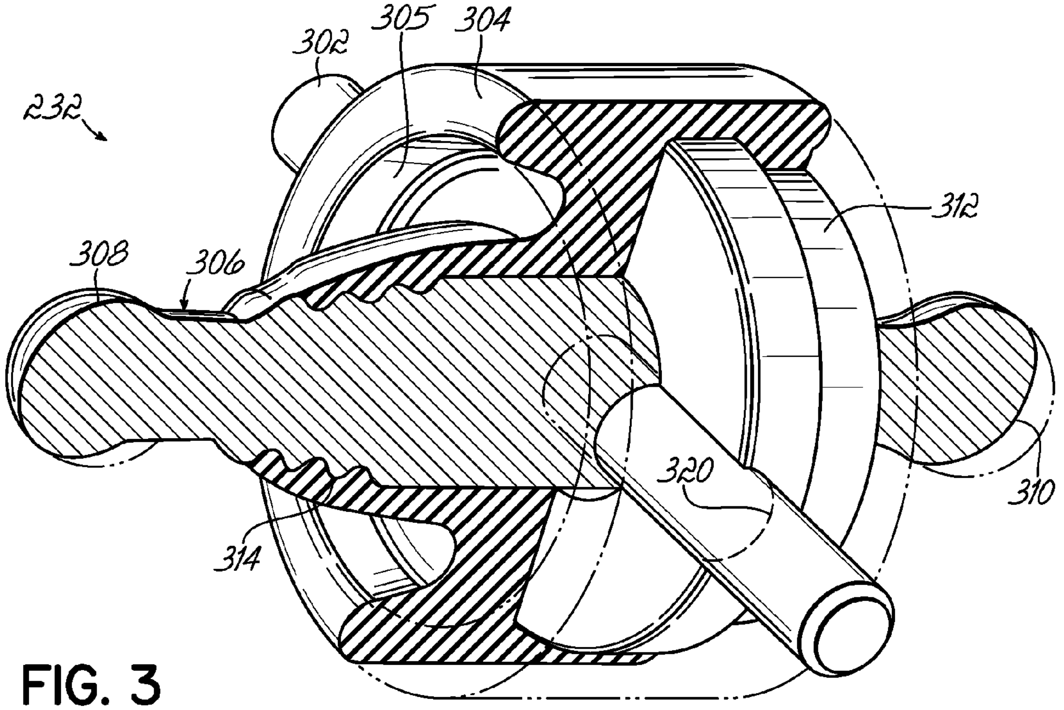
FIG. 3 illustrates a partial cutaway view of an exemplary actuator assembly in accordance with the invention.
Figure 3A:
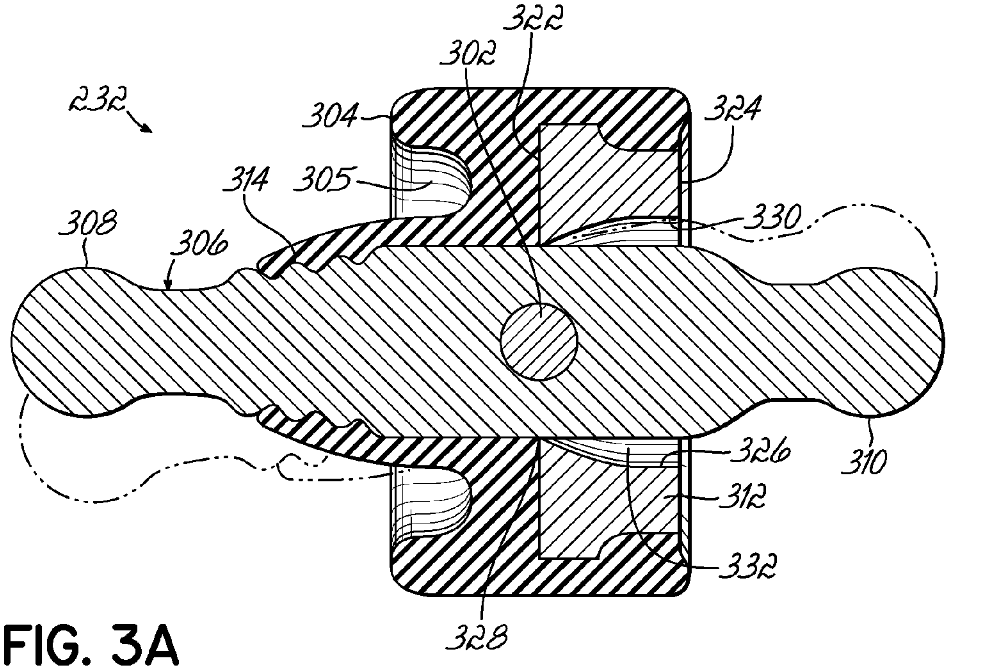
FIG. 3A illustrates a sectional view of the exemplary actuator assembly of FIG. 3.

FIGS. 3 and 3A depict an exemplary actuator assembly comprising flexible seal portion 304 and a bushing support 312, such as a washer, formed around a pivoting lever arm 306. As described above, the seal 304 sits within an appropriately shaped cavity formed by the mating surfaces of an actuating section and a hydraulic section of a liquid dispenser.

A pivot pin 302 extends through the pivoting lever arm 306 and may be coupled thereto, such as through a press fit, and also extends through the flexible seal 304 such that the pivoting lever arm 306 pivots about a pivot point defined by pin 302. The material from which the flexible seal 304 is constructed can be any of a variety of available elastomers or plastics, such as, for example, the fluoroelastomer marketed as Viton®. The bushing support 312 radially supports the seal 304 from the center, unlike a diaphragm seal which is supported along its periphery. The bushing support 312 also provides support for the flexible seal 304 to withstand hydraulic pressure generally operating along the major axis of the pivoting lever arm 306. In this way, the seal 304 may be configured to withstand relatively large hydraulic pressures, such as from approximately 80 psi to at least 1,500 psi. The seal 304 may also be configured for other hydraulic pressure ranges. For example, the seal 304 may be configured to withstand hydraulic pressure from approximately 100 psi to approximately 1,500 psi. Preferably, the seal 304 may be configured to withstand hydraulic pressures from approximately 200 psi to approximately 1,500 psi. More preferably, the seal 304 may be configured to withstand hydraulic pressure from approximately 300 psi to approximately 900 psi. Still more preferably, the seal 304 may be configured to withstand hydraulic pressures from approximately 400 psi to approximately 800 psi.

Accordingly, in an advantageous embodiment, the bushing support 312 is made of a rigid material such as brass, or other metal, and coupled with the pivoting lever arm 306 and the flexible seal 304. The bushing support 312 may include a semi-circular cavity 320 adapted to receive pin 302 therein. The bushing support 312 may not be rigidly coupled with the pin 302 so that the bushing support 312 and pin 302 may move relative to each other. The flexible seal 304 may be molded over the pivoting lever arm 306. In addition, the pivoting lever arm 306 may advantageously include a profile that provides more surface area on the pivoting lever arm 306 for the flexible portion 304 to grip. This profile, for example, may include ridges 314 or grooves. Alternatively, or in addition, the flexible seal 304 may be adhered to the pivoting lever arm 306. In the exemplary embodiment of FIG. 3, the flexible seal 304 includes a recessed portion 305. However, this shape is exemplary in nature and other shapes are contemplated as well.

As shown in FIG. 3A, the bushing support 312 includes a hydraulic face 322 and an actuating face 324. The hydraulic face 322 abuts seal 304 and lies in a plane going through a pivot point defined by the intersection of the pin 302 and the pivoting lever arm 306. The bushing support 312 also includes a bore 326 adapted to receive the pivoting lever arm 306 therethrough. The bore 326 has a hydraulic end 328 having a diameter substantially equal to the diameter of the pivoting lever arm 306. In this way, the hydraulic face 322 may fully support the seal 304 and further prevent extrusion of the seal 304 into the bore 326. The bore 326 is further configured to increase in diameter in a direction toward actuating end 330. For instance, the bore 326 may be generally cone-shaped. The increase in diameter of bore 326 from hydraulic end 328 to actuating end 330 provides a clearance space 332 that allows the pivoting lever arm 306 to pivot, as illustrated by the phantom lines in FIG. 3A.

The pivoting lever arm 306 includes an end 308 that couples with the second moveable member in the hydraulic section, such as needle 220 in FIG. 2, and another end 310 that couples with the first moveable member in the actuating section, such as piston 212 in FIG. 2. When coupled in this manner, the pivoting lever arm 306 pivots about a point where the arm 306 is intersected by the pin 302 and, thus, the up or down motion of the end 310 translates into an oppositely-directed motion of the end 308. The pivoting lever arm 306 and the pin 302 are advantageously made from high strength steel. However, other materials such as brass, aluminum or a high-strength non-metallic or composite material may be used as well.

When the pivoting lever arm 306 moves, the flexible seal 304 flexes but maintains a seal along its outside periphery and also between itself and the pivoting lever arm 306. Such a small amount of flexure will not disturb the sealing arrangement provided by the seal 304. Constructing the flexible seal 304 from Viton® or similar material will permit angular deflection of around 4.5 degrees without compromising the seal between a hydraulic section and an actuating section. Thus, even though the flexible portion 304 may flex as the pivoting arm 306 moves, it still acts as a flexible seal that will last longer and be more reliable than earlier dynamic seals for reciprocating shafts. Different materials and different size seals may be used if angular deflection of greater than around 4 to 5 degrees is desired.

Additionally, in a prior-art vertical arrangement of hydraulic and actuating sections, there is substantial hydraulic pressure pushing the second moveable member back out of the hydraulic section towards the actuating section. The hydraulic pressure from the pressurized liquid within the hydraulic section acted to push the second moveable member in a direction opposite to the force supplied by the actuating section. Thus, the actuating section was required to be sized to overcome this additional hydraulic force. In the present embodiments having a side-by-side arrangement, such as for example, that shown in FIG. 2, the pressurized liquid 216 within the hydraulic section 202 still exerts a force against the pivoting lever arm 230 but this force is transverse to the direction of motion of the piston 212. This transversely directed force is transferred to the bearing surfaces of the support 312, not to the piston 212. In the embodiment of FIG. 3 for example, the force is transferred by pivot pin 302, although alternate load bearing means are contemplated. Bushing support 312 transfers the load to the pneumatic body 204 while the ball end 308 of the pivoting lever arm 306 is designed to fit into opening 237 (see FIG. 2) with clearance so that no transverse load is transferred to the piston 212.

Figure 4:
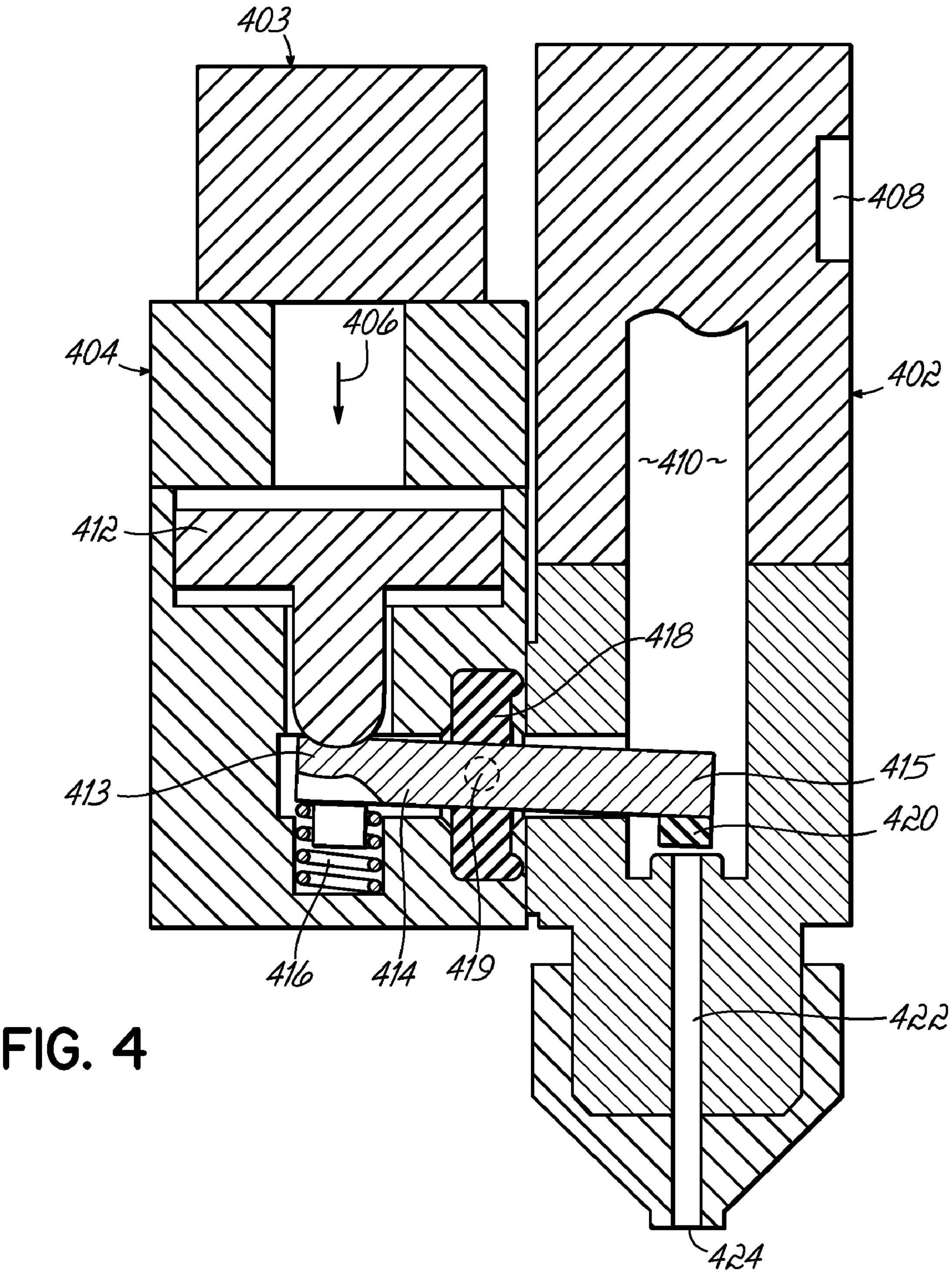
FIG. 4 illustrates a sectional view of an exemplary dispenser in accordance with the invention in which the actuator assembly operatively couples with a liquid dispensing passageway.

FIG. 4 illustrates one alternative embodiment of a dispenser in which the hydraulic section does not include a needle. The dispenser of FIG. 4, includes a hydraulic portion 402, a pneumatic portion 404, and a solenoid portion 403. As described earlier, the solenoid portion 403 delivers a pressurized air 406 in a controlled manner to the piston 412. In response, the piston 412 is either displaced downward by the pressurized air 406 or urged upward by a spring 416.

According to this embodiment, a pivoting lever arm 414 extends from the pneumatic section 404, through a seal 418, into a chamber 410 of the hydraulic section 402. The pivoting lever arm 414 engages the spring 416 on one end 413 and a passageway 422 at the other end 415. The spring 416 operates to push the pivoting lever arm 414 upward against the piston 412. In response to sufficient pressurized air 406 to overcome the spring 416, the piston 412 operates to push downward on the pivoting lever arm 414. The up and down motion of the pivoting lever arm 414 causes it to pivot around a pivot point 419, such as a pin. The pivoting of the pivoting lever arm 414 causes the opposite end 415 to move in a direction (up or down) opposite to that of the end 413.

The hydraulic section 402 includes an inlet 408 for receiving pressurized liquid, such as, for example, hot melt liquid adhesive. This liquid is received into a chamber 410 and exits through a passageway 422 out an orifice 424. On the end 415 of the pivoting lever arm 414 within the chamber 410, there is a pad 420 attached that fits over the passageway 422. When the end 415 is lowered, the pad 420 covers an opening to passageway 422 such that the passageway 422 is blocked and no liquid is dispensed from the orifice 424. However, when the end 415 is raised so that the passageway 422 is no longer blocked by the pad 420, then liquid leaves the chamber 410 through the orifice 424. The pad 420 may be bonded to the arm 414 in a variety of ways and may be constructed from a material that can advantageously seal the passageway 422 such as, for example, plastic, elastomer, rubber or a high performance fluorocarbon material. Additionally, instead of a flat rectangular shape, the pad 420 may have alternative shapes such as, for example, a ball.

When the arm 414 is positioned so that liquid is being dispensed from the orifice 424, the portion of the arm 414 within the chamber 410 is hydraulically balanced. Even though the liquid within the chamber 410 is under pressure, the pressure on the top and the bottom of the arm 414 balances out. A hydraulically balanced arm permits faster movement of the end 415 and its closing action with the passageway 422. Additionally, the force needed to move the arm 414 is reduced as well. For example, pressurized air 406 at between 20-40 psi and in quantities of 0.1 cc to 0.5 cc is sufficient to operate the piston 412. As a result, a smaller piston may be utilized resulting in a smaller dispensing module. In previously-described embodiments (and later-described embodiments), the end 415 of the pivoting lever arm 414 is sometimes replaced with a needle. In these embodiments, as well, the side-by-side arrangement of the hydraulic section and the pneumatic section create a hydraulically balanced needle such that when the valve is open, hydraulic forces on the needle cancel each other out and the needle "floats" in liquid. As a result, resistance to closing the needle is reduced, or eliminated, making the needle easier to close.

Figure 5:
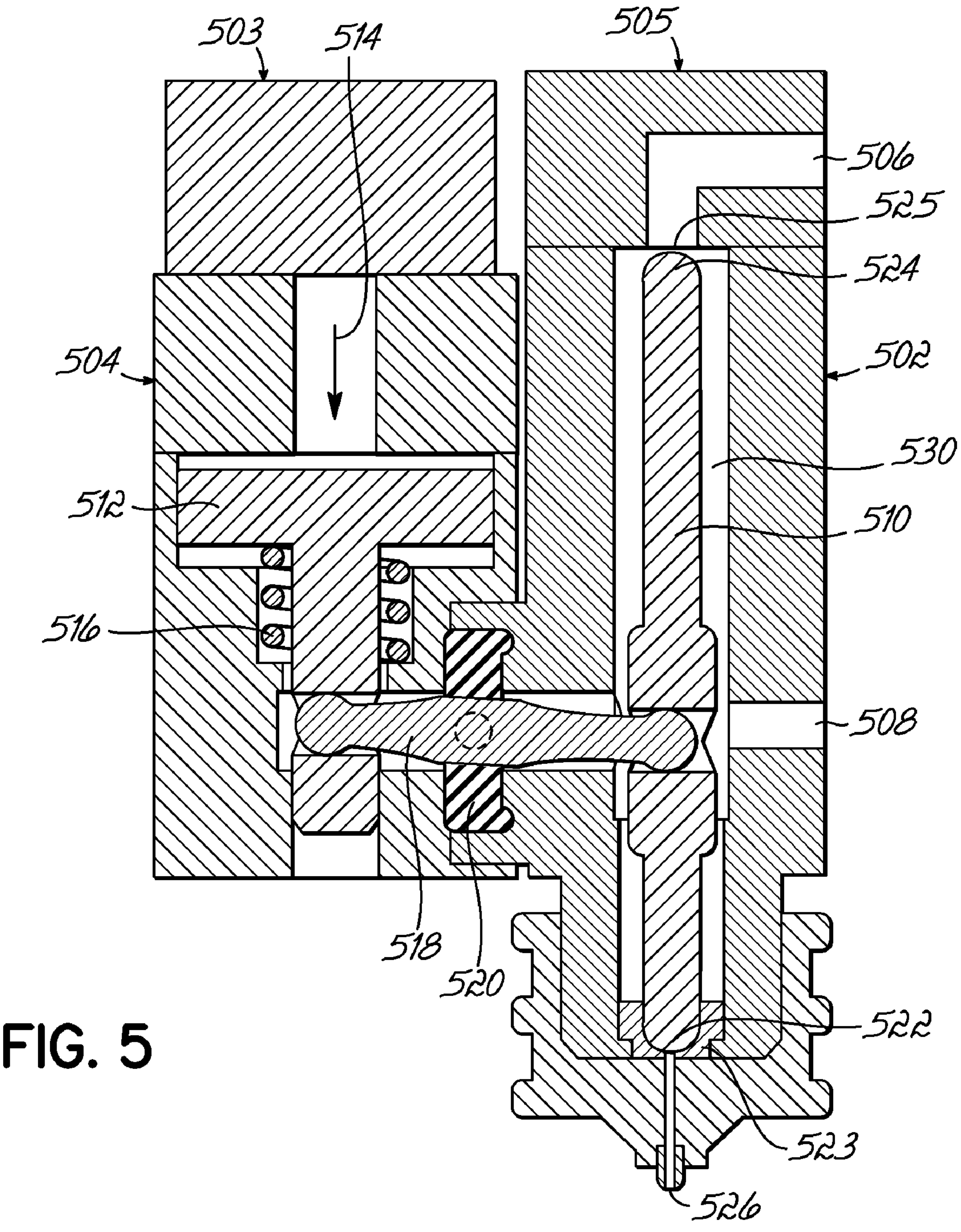
FIG. 5 illustrates a sectional view of an exemplary dispenser in accordance with the invention that includes a recirculating port.

Another embodiment of the invention is illustrated in FIG. 5. Similar to previous drawings, the general components of the dispenser are the same. A manifold 505 is coupled with a hydraulic section 502 that is coupled, in a side-by-side manner, with a pneumatic section 504. A flexible seal 520 is located between the two sections and prevents liquid from the hydraulic section 502 from leaking into the pneumatic section 504. A pivoting lever arm 518 operatively couples a piston 512 of the pneumatic section 504 with a needle 510 of the hydraulic section 502. A solenoid section 503 delivers pressurized air 514 in a controlled manner to the piston 512 so that it may push downward against the spring 516 in order to control the movement of the needle 510.

The dispenser of FIG. 5 differs from earlier dispensers in that it includes an inlet port 508 for receiving a pressurized liquid, such as hot melt liquid adhesive, as well as a recirculating port 506 for diverting pressurized liquid back into the manifold section 505. Such a dispenser is commonly referred to as a three-way dispenser. As depicted in FIG. 5, the end 522 of the needle 510 is seated within a seat 523 in order to prevent liquid from leaving the chamber 530 via the dispensing orifice 526. Instead, liquid within the chamber 530 travels upward to the recirculating port 506 where it returns to the manifold section 505. If the needle 510 is moved upward, such as by moving the piston 512 downward, then the end 524 of the needle 510 will block the seat 525 of the recirculating port 506. In this configuration, the end 522 will no longer sealingly engage the seat 523 and liquid from the chamber 530 will be dispensed via the orifice 526.

Figure 6:
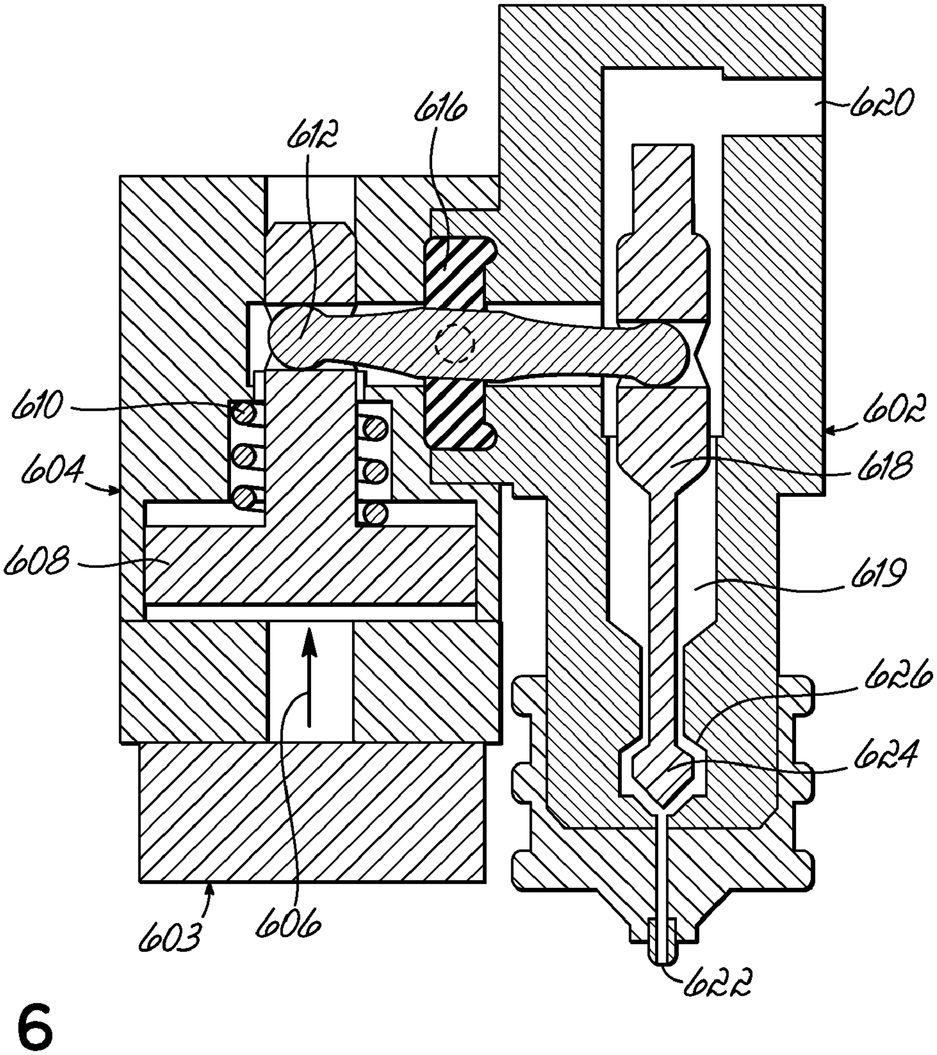
FIG. 6 illustrates a sectional view of an exemplary dispenser in accordance with the invention that includes snuff-back operation.

One alternative embodiment, to those already described, is depicted in FIG. 6. According to this embodiment, a hydraulic section 602 is coupled with a pneumatic section 604 in a side-by-side manner. Between the two sections a cavity is formed by their mating faces to securely hold a flexible seal 616 having a pivoting lever arm 612 extending therethrough. The pivoting lever arm 612 operatively connects the piston 608 of the pneumatic section 604 with the needle 618 of the hydraulic section 602 such that movement of the piston 608 is translated into movement of the needle 618.

In contrast to previously described embodiments, the piston 608 of FIG. 6, moves upward in response to the solenoid 603 providing pressurized air 606 while the spring 610 pushes the piston 608 downward when no pressurized air 606 is being applied. Upward motion of the piston 608 causes the needle 618 to descend so that the end 624 no longer engages the valve seat 626. With the needle 618 in this position, liquid within the chamber 619 (received via an inlet port 620) is dispensed out via the orifice 622. When the piston 608 moves downward, the needle 618 moves upward and causes the end 624 to engage the valve set 626 thereby cutting off the dispensing of any liquid within the chamber 619. This type of motion of the needle 618 is known as "snuff-back" and provides the benefit that the needle 618 tends to draw liquid up from the orifice 622 when the end 624 engages the seat 626 instead of forcing the liquid out the orifice 622.

Figure 7:
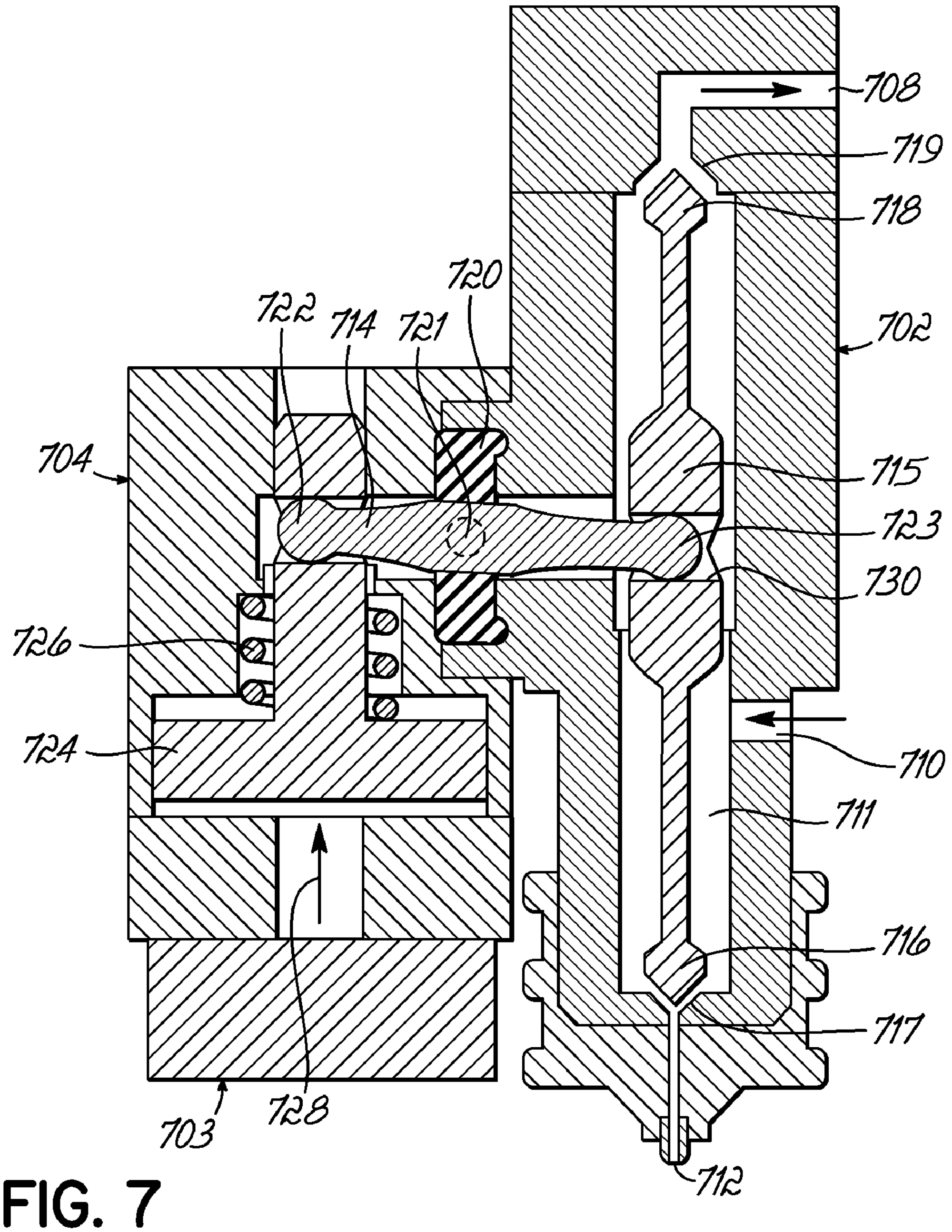
FIG. 7 illustrates a sectional view of an exemplary dispenser in accordance with the invention that includes a self-aligning needle.

FIG. 7 depicts another three-way liquid dispenser having a recirculating flow for the liquid. Liquid enters the chamber 711 of the hydraulic section 702 via an inlet port 710 and can exit from either the dispensing orifice 712 or a recirculating port 708. Depending on the position of the needle 715, either the end 718 will sealingly engage the seat 719 or the other end 716 will sealingly engage the seat 717. The position of the needle 715 is controlled by the pivoting lever arm 714 that extends from the hydraulic section 702 to the pneumatic section 704. The pivoting lever arm 714 passes through a flexible seal 720 and pivots about a pivoting point 721, such as that defined by a pin. One end 722 of the arm 714 engages the piston 724 and the other end 723 engages the needle 715. The spring 726 acts to force the piston 724 downward and the solenoid section 703 delivers pressurized air 728 to urge the piston 724 upward.

In particular, the end 723 may be spherical in nature and interact with a through-hole 730 bored into the needle 715 without being rigidly fixed to one another. As the end 723 moves up and down, a tangential point on its spherical surface contacts the inside surface of the through-hole 730. Additionally, the seats 717 and 719 are shaped to complement the ends 716 and 718 of the needle 715. Thus, as an end 716, 718 moves towards a seat 717, 719, respectively, the needle 715 is urged into alignment with the seat 717, 719 because the needle 715 is free to wobble around its connection with the end 723 of the pivoting lever arm 714. In this way, the needle 715 is self-aligning.

In contrast, standard vertical arrangements of the pneumatic and hydraulic sections in dispensing guns create a situation in which the needle in the pneumatic section is not self-aligning. The rigid connection of the needle to the actuating piston as well as the dynamic seal below the piston restrict the movement of the needle so that it does not automatically align itself with the valve seat while being moved into the closed position.

Figure 8:
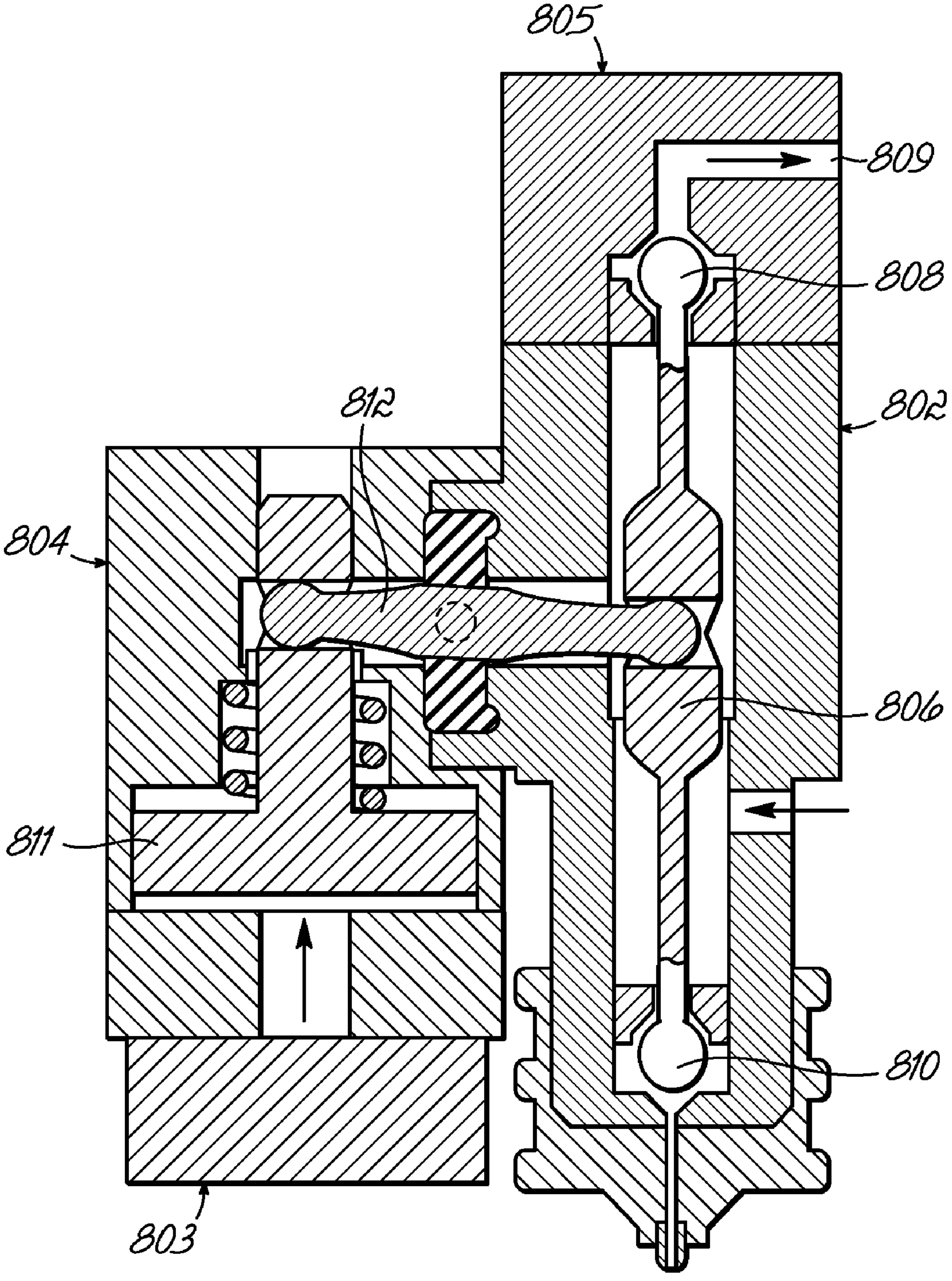
FIG. 8 illustrates a sectional view of an exemplary dispenser in accordance with the invention that includes snuff-back operation and a recirculating port.

FIG. 8 illustrates an embodiment of the present invention that incorporates both a three-way dispenser and snuff-back operation. The hydraulic section 802 includes a needle 806 that closes at the dispensing end 810 via upward motion, thereby providing the snuff-back operation. Additionally, the end 808 interfaces with a recirculating port 809 in order to provide a liquid return path to the manifold 805. The pneumatic section 804 and solenoid section 803 operate as described earlier to cause the piston 811 to move the pivoting lever arm 812 in a way so as to control the movement of the needle 806.

Figure 9:
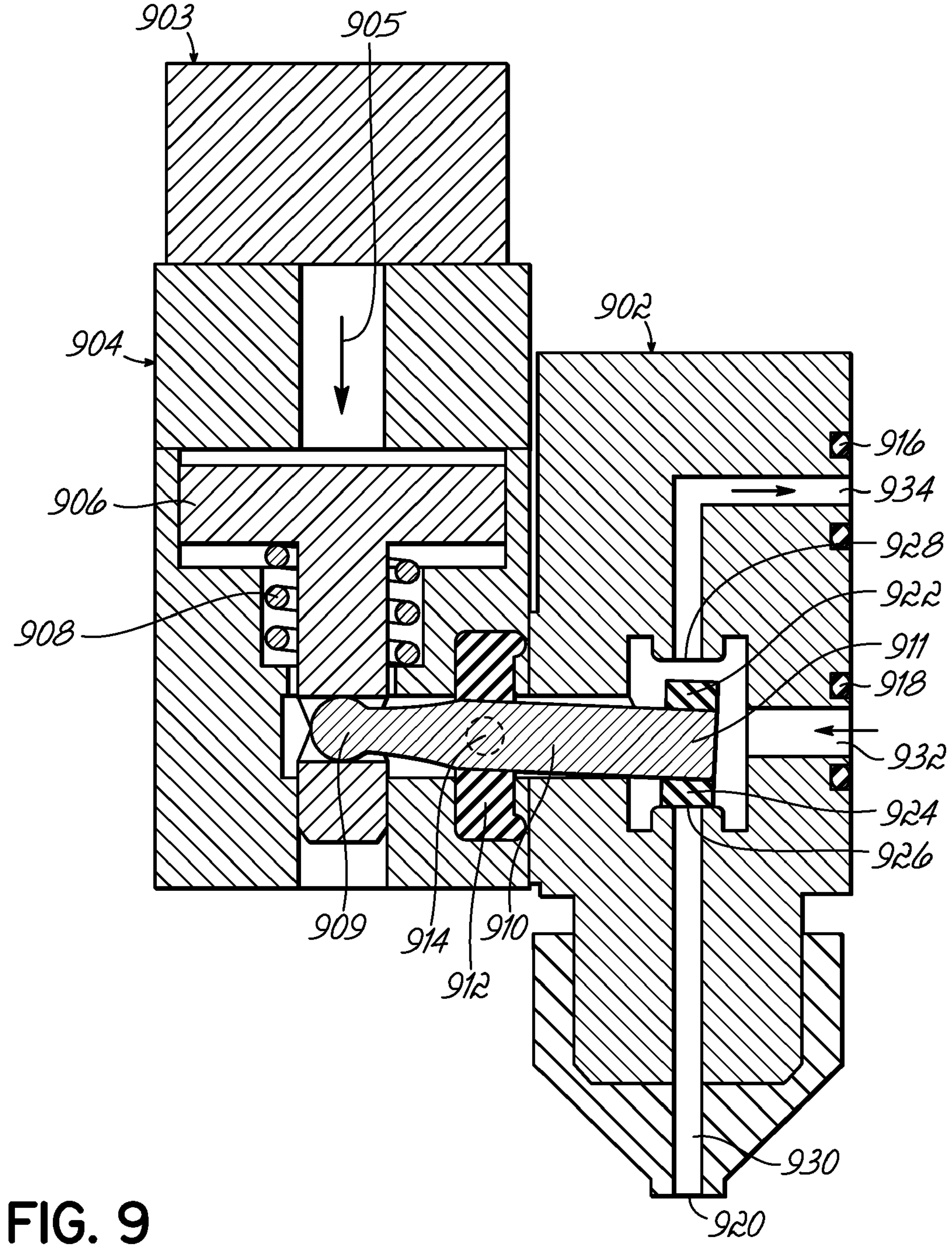
FIG. 9 illustrates a sectional view of an exemplary dispenser in accordance with the invention that utilizes a pad in the hydraulic section in accordance with the invention.
Figure 10:
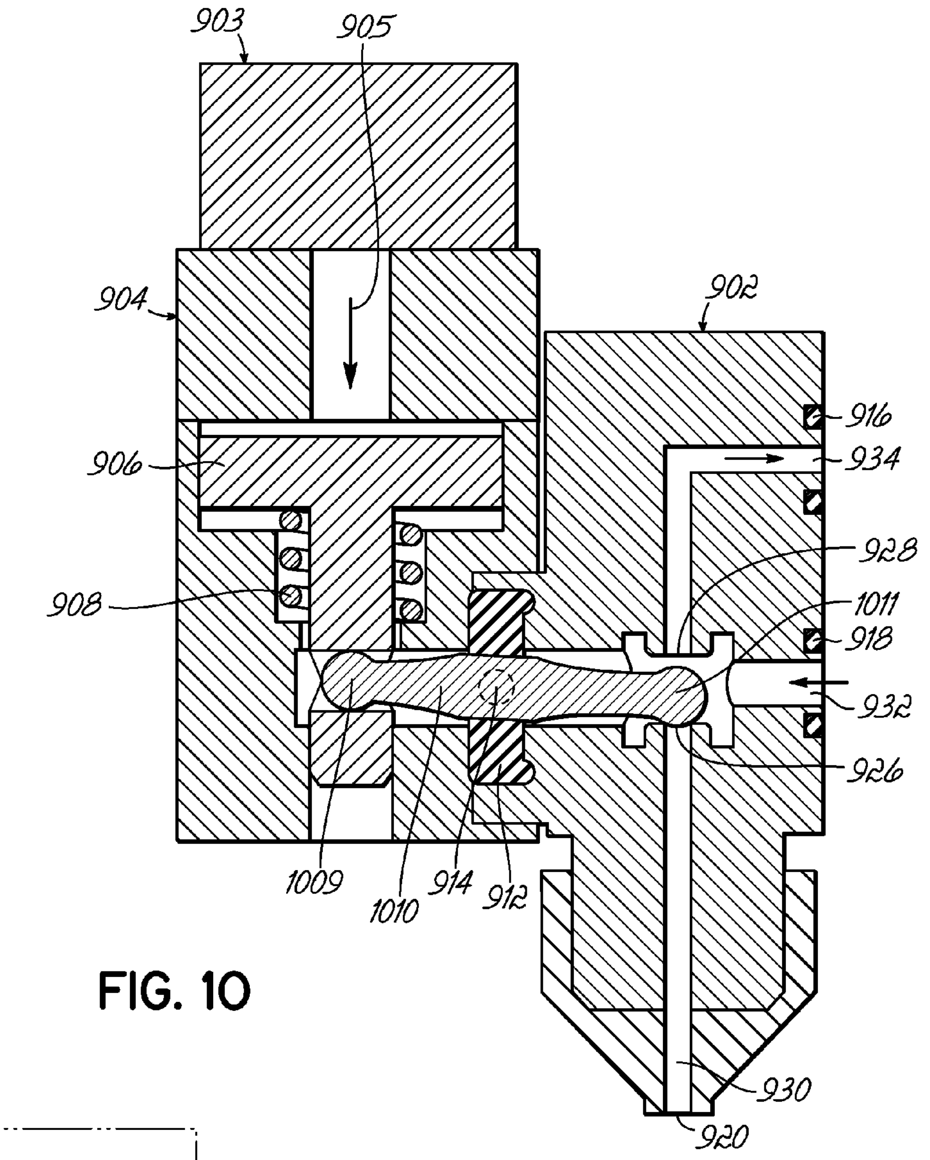
FIGS. 10 and 11 illustrate alternative pivoting lever arms in accordance with the invention useful with the exemplary dispenser of FIG. 9.

FIGS. 9 and 10 illustrate two different embodiments of the invention that provide a three-way implementation without the presence of a needle within the hydraulic section. In particular, the hydraulic section 902 includes a recirculating port 934 and an inlet port 932. Pressurized liquid, such as hot melt liquid adhesive is received from a manifold (not shown) via the inlet port 932 and may return to the manifold via the recirculating port 934. These ports 932, 934 may include a respective O-ring 918, 916 or similar device to provide a liquid seal when the hydraulic section is coupled with the manifold (not shown).

A solenoid 903 provides pressurized air 905, or other fluid, to operate the piston 906 of the pneumatic section 904. In particular, the pressurized air 905 operates to push the piston 906 downward against the force of the spring 908 which urges the piston 906 upward. A pivoting lever arm 910 extends from within the pneumatic section 904 to the hydraulic section 902. This pivoting lever arm 910 pivots about a pivot point 914, such as, for example, a pin. The pivot arm 910 also passes through a flexible seal 912, the seal 912 preventing pressurized liquid within the hydraulic section 902 from leaking into the pneumatic section 904.

One end 909 of the pivoting lever arm 910 engages the piston 906 so that movement of the piston 906 results in movement of the end 909. When the end 909 moves, it causes the pivoting lever arm 910 to rotate or pivot thereby causing the end 911 to move. The end 911 of the pivoting lever arm 910 is located within the hydraulic section 902 and moves opposite to that of the other end 909. Furthermore, this end 911 includes two pads 922, 924 that are bonded thereto. When the end 911 moves upward, the pad 922 engages the seat 928 and closes off the recirculating port 934. Concurrently, the pad 924 disengages the seat 926 thereby allowing liquid to enter the passageway 930 and be dispensed through the orifice 920. When the end 911 moves downward, the pad 924 and seat 926 close off the passageway 930 and the pad 922 and seat 928 disengage so as to allow liquid to exit via the recirculating port 934. These pads are similar in construction to the pad 420 described in relation to FIG. 4.

The embodiment of FIG. 10 is substantially similar to that of FIG. 9 except for the end of the pivoting lever arm within the hydraulic section. In particular, the pivoting lever arm 1010 includes an end 1009 that engages the piston 906 as before. However, the end 1011 does not include the use of additional pads. Instead, the end 1011 is shaped to effectively engage the seats 926 and 928. Thus, the end 1011 of the pivot arm 1010 opens and closes liquid passageways to the recirculating port 934 and the dispensing orifice 920.

Figure 11:
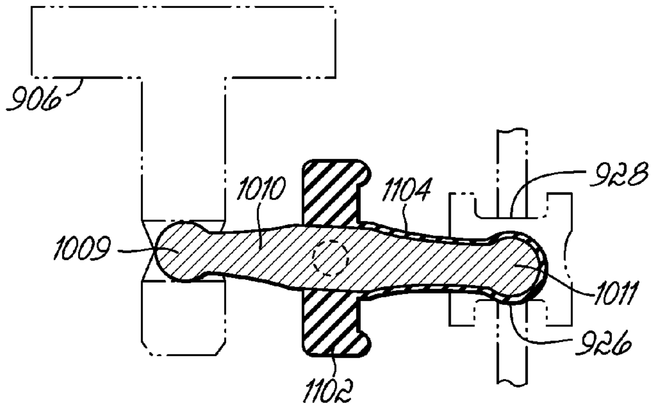

FIG. 11 illustrates an alternative embodiment for the pivoting lever arm 1010 of FIG. 10. In this particular embodiment, the flexible seal 1102 is formed similar to before but has a portion 1104 that substantially encloses the end 1011 of the pivoting lever arm 1010. The portion 1104 provides a resilient surface that advantageously cooperates with valve seats 926 and 928 to provide fluid-tight seals and further blocks travel of any liquid between the seal 1102 and the pivoting lever arm 1010.

Figure 12:
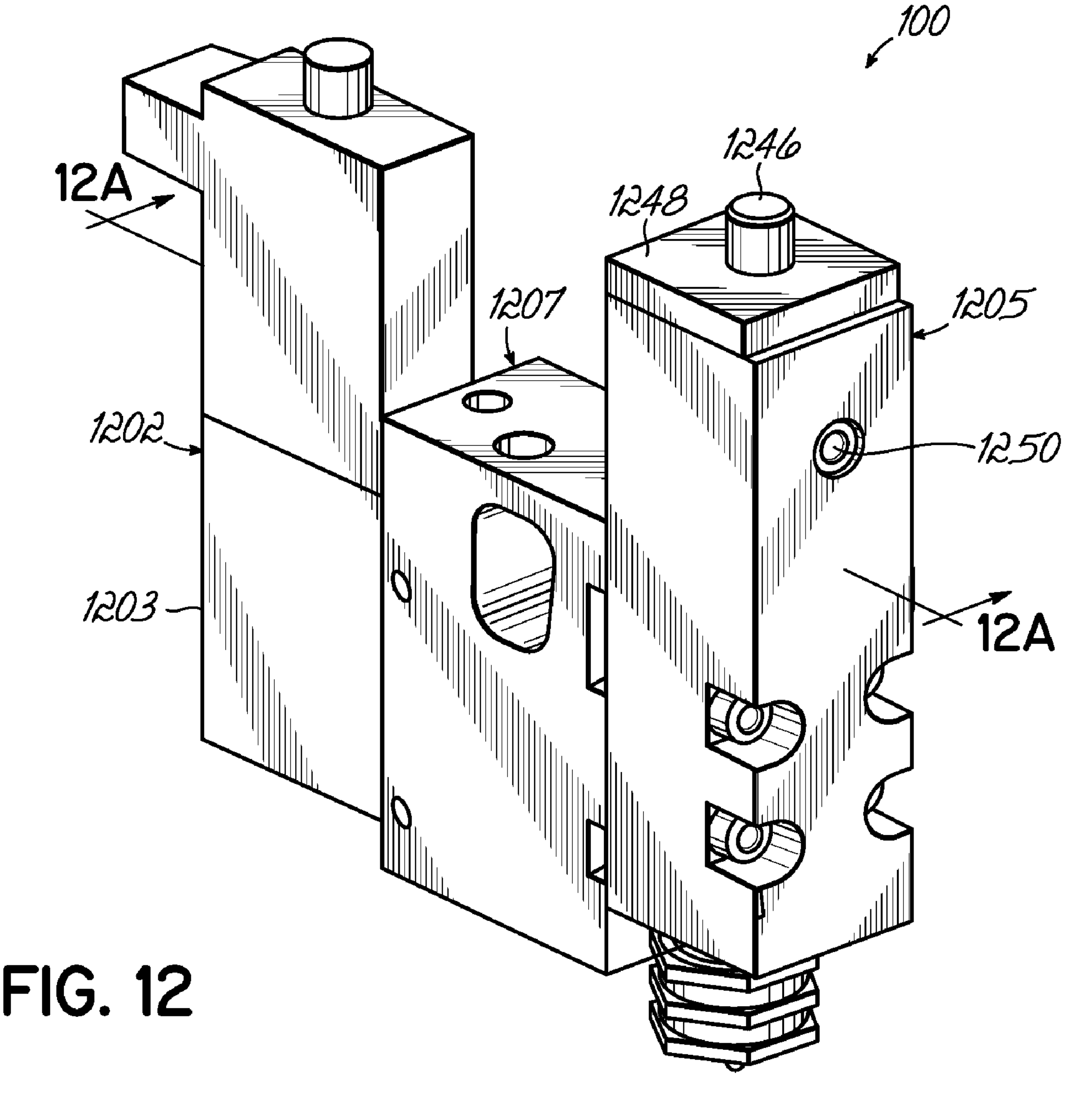
FIG. 12 illustrates a perspective view of a dispenser in accordance with the invention wherein the solenoid and actuating section are formed as an integral assembly.
Figure 12A:
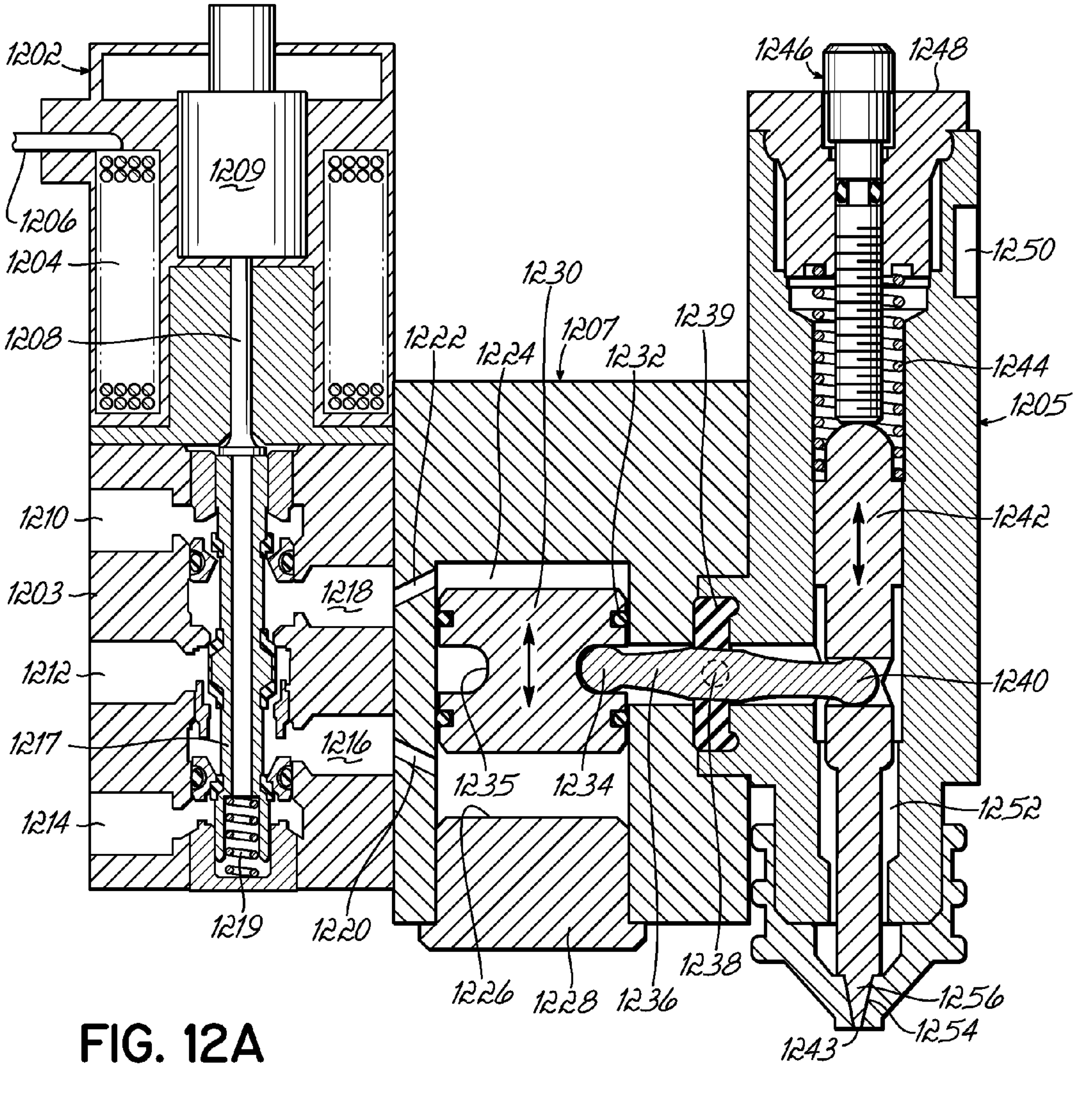
FIG. 12A illustrates a sectional view of the dispenser of FIG. 12 generally taken along line 12A-12A.

FIGS. 12 and 12A show an alternate embodiment of a dispenser having a pneumatic section with a double acting piston coupled with a solenoid for supplying pressurized fluid, such as air, to both sides of the piston. The alternative embodiment of FIG. 12 includes a solenoid 1202 and a housing 1203. The solenoid 1202 includes a coil 1204 and an armature comprised of body 1209 and shaft 1208. Through the electric current supplied to the coil 1204, via an electrical connector 1206, an electrical field is created that moves the armature (1208, 1209) up and down. The housing 1203 includes a number of passageways and a spool or poppet 1217. The poppet 1217 is pushed down by the shaft 1208 of the armature and a spring 1219 urges the poppet 1217 upwards against the force of the shaft 1208. Included within the housing 1203 is a first exhaust port 1210, a second exhaust port 1214 and an air inlet port 1212. There is also a first passageway 1218 and a second passageway 1216 that are in fluid communication, respectively, with passages 1222 and 1220 of the pneumatic section 1207.

The exemplary housing 1203 and solenoid 1202 are distributed by MAC Valves as Model Number 44B-L00-GFDA-1KV. As this is a commercially available product, the operation of the seals of the poppet 1217 and the cavity in which it moves are not described in minute detail. However, its general operation is described herein. A constant source of pressurized air is received at the inlet port 1212 and is directed to one of the passageways 1216 or 1218. The vertical position of the poppet 1217 determines if passageway 1216 or 1218 is in communication with the inlet port 1212.

For example, if the poppet 1217 is positioned so that air is directed from the inlet port 1212 through the passageway 1216, then it flows into passage 1220 and into the cavity 1226 below the piston 1230. This air flow will force the piston 1230 to move upward. As the piston 1230 moves upward, air is forced from the cavity 1224 through the passage 1222. With the poppet 1217 in this position, the air is able to exit the passage 1222 into the passageway 1218 and out the first exhaust port 1210.

Conversely, if the air is directed from the inlet port 1212 through the passageway 1218, then it flows into passage 1222 and into the cavity 1224 above the piston 1230. This air flow will force the piston 1230 to move downward. Accordingly, air exits the cavity 1226 via the passage 1220 and enters the passageway 1216. Because of the poppet position, the air is able to escape from passageway 1216 out the second exhaust port 1214.

In this manner, the solenoid 1202 and poppet 1217 can be used to move the piston 1230 up and down within the pneumatic section 1207. The piston 1230 may include one or more O-rings 1232 as depicted in FIG. 12. The pneumatic section 1207 typically includes an open bottom that permits the piston 1230 to be inserted therein. This bottom can be closed off with a plug 1228 that may be threaded or otherwise connected to the pneumatic section 1207. By using pressurized air to move the piston 1230 both up and down, the pneumatic section 1207 eliminates the spring depicted in other embodiments described herein. Thus, movement of the piston 1230 does not have to overcome the spring force and, therefore, less force (i.e., volume or pressure of air) is needed to move the piston 1230. Furthermore, when air pressure changes, the opening and closing forces remain balanced.

According to one embodiment, the solenoid section (1202 and 1203) are integrally formed with the pneumatic section 1207. Because of the side-by-side arrangement of the integral solenoid and pneumatic housing with the hydraulic section 1205, the solenoid 1202 and housing 1203 are thermally separated from the high temperatures usually associated with the hydraulic section 1205. For example, in the exemplary arrangement of FIG. 12, the temperature at or near the hydraulic section 1205 was found, during testing, to be approximately 350° F. while the temperature of the coil 1204 was approximately 150° F. A number of benefits result from this thermal separation. The solenoid 1202 will require less insulation than with conventional dispensing modules and the solenoid 1202 will likely be more reliable. Within the housing 1203, the various seals and O-rings may now be constructed of a lower temperature material than conventional hot melt dispensers. Such material would include rubber, such as, for example, case hardened nitrile material which has better friction and wear characteristics than high temperature rubbers such as Viton®.

The piston 1230 advantageously includes a groove 1235 extending around the center of its periphery in which one end 1234 of the pivoting lever arm 1236 will engage. The pivoting lever arm 1236 extends through the flexible seal 1239 into a chamber 1252 of the hydraulic section 1205. The pivoting lever arm 1236 pivots around a pivot point 1238, such as that defined by a pin, so that when one end 1234 moves downward the other end 1240 moves upward, and vice-versa. The end 1240 is operatively coupled with a needle 1242 within the hydraulic section 1205. Thus, when the end 1240 moves up or down, the needle 1242 moves up or down as well.

In the hydraulic section 1205, a pressurized liquid is received at the inlet port 1250 and enters the chamber 1252. If the end 1256 of the needle 1242 is sealingly engaged with the seat 1254, then the liquid remains within the chamber 1252. If, however, the needle 1242 is raised so as to disengage its end 1256, then liquid is dispensed from the chamber 1252 via the dispensing orifice 1243. The needle 1242 may extend through the orifice (i.e., zero-cavity) or partially through it (i.e., reduced cavity). In this embodiment, a biasing member, such as a spring 1244, biases the needle 1242 downward and, therefore, the movement of the piston 1230 is sufficient to overcome the force of the spring 1244 in order to dispense liquid from the orifice 1243. Those of ordinary skill in the art will recognize that the biasing member may be configured as a piston having pressurized air on one or both sides of the piston.

The embodiment of FIG. 12A explicitly includes a stroke adjust mechanism 1246. The mechanism 1246 is a threaded rod that passes through a cap 1248 and can be rotated clockwise or counterclockwise to adjust its distance from the top of the needle 1242. The position of the mechanism 1246 controls the amount that the needle 1242 may travel upward.

Figure 13:
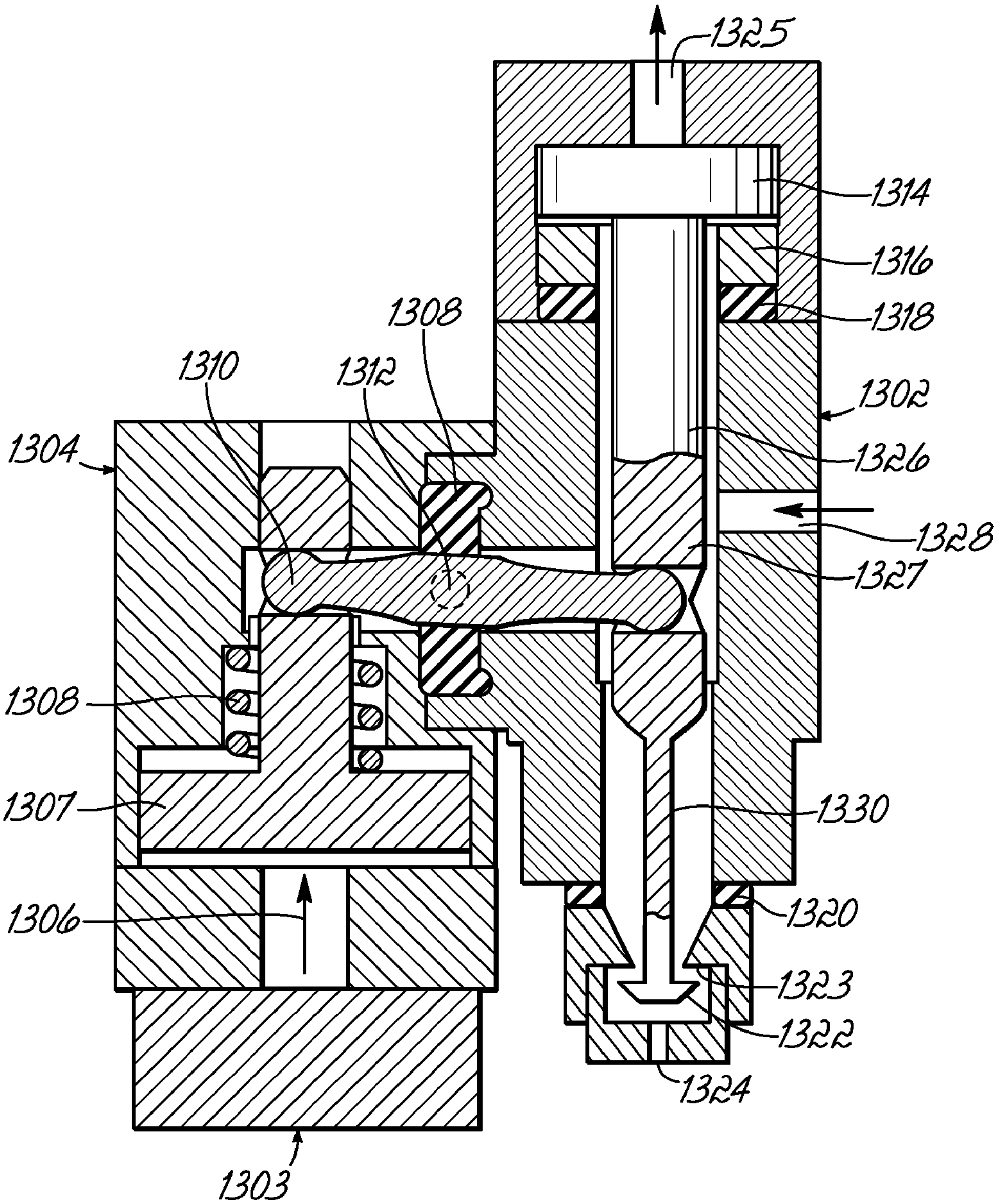
FIG. 13 illustrates a sectional view of an exemplary dispenser in accordance with the invention that includes a pressure balanced hydraulic section.

FIG. 13 illustrates another exemplary dispenser that is similar in many respects to embodiments described earlier. These similar aspects will be briefly described but without great detail. A hydraulic section 1302 is arranged in a side-by-side manner with a pneumatic section 1304 that is coupled with a solenoid 1303. The solenoid 1303 controls the delivery of pressurized air 1306 to a piston 1307 to overcome a spring 1308. Movement of the piston 1307 results in movement of the pivoting lever arm 1310 that pivots around a pivot point 1312 and that passes through a flexible seal 1308. The movement of the pivoting lever arm 1310 is translated into movement of a needle 1327 within the hydraulic section 1302. Movement of the needle 1327 results in dispensing of liquid or recirculating of liquid within the hydraulic section 1302. The needle 1327 of this embodiment includes a large diameter portion 1326 and a small diameter portion 1330. Liquid enters the hydraulic section 1302 through an inlet port 1328 and is either dispensed from the orifice 1324, or enters the recirculating port 1325, depending on the position of the needle 1327.

The piston 1307 must overcome a number of forces to hold the needle 1327 in a closed position. Thus, the exemplary hydraulic section 1302 includes a number of beneficial features to help balance the pressures on the needle 1327. The large diameter poppet 1314 provides a long flow engagement on the recirculating side that results in an increased pressure drop. The small diameter poppet 1322 provides a short flow engagement on the delivery side that results in increased flow capability. The tapering of the poppet 1322 and the seat 1323 also reduces flow resistance when liquid is dispensed.

Additional features within this embodiment include the different diameters of the seats 1316 and 1323. The seat 1316 with which the poppet 1314 seals is larger in diameter than that of the seat 1323 with which the poppet 1322 seals. Because of the relationship between force, pressure and area, the large diameter at the seat 1316 provides a relatively large force even if under a smaller pressure. Conversely, the small diameter at the seat 1323 provides a relatively smaller force even under a larger pressure. For example, if the seats are the same diameter and the delivery pressure is 500 psi, then a 50 psi drop across the recirculation seat 1316 will reduce the force required to seal the delivery side by 10%. However, if the recirculation seat 1316 is sized to be twice the area of the delivery seat 1323, then the same 50 psi drop will reduce the force required to seal the delivery side by 20%.

Elastomer members 1320 and 1318 also provide additional benefits. These members are compressible and may be constructed from an elastomer or similar material that can withstand the heat experienced within the hydraulic section 1302. When the needle 1327 moves upward, the compressible member 1318 expands and, thereby, reduces the effective stroke length of the needle 1327 on the recirculating side. The result is that there is effectively an increase in the pressure drop at the recirculating side. Independently, the compressible member 1320 compresses when the needle is moved so as to seal the poppet 1322 and the seat 1323. The additional travel provided by the compressible member 1320 improves the snuff-back operation of the hydraulic section 1302.

By way of example, the delivery side seat 1323 may be designed so as to close against 500 psi. If the seat exit diameter is 1/16 inch, the area is 0.003 square inches, and the force acting down is 1.5 pounds. If there is a 50 psi drop across the recirculation seat 1316 and it is the same size (i.e., 0.003 square inches), then the force acting upward is 0.015 pounds. To close the delivery seat 1323, the piston 1307 must deliver 1.485 pounds of force. If, however, the 50 psi drop is seen across a recirculation seat 1316 that is 1/8 inch in diameter, then the force acting up is 0.6 pounds (i.e., 50 psi×0.012 square inches). In this second case, the piston 1307 must overcome 0.9 pounds to close the delivery seat 1323. As a result, the net force the piston 1307 would need to provide to close the delivery seat 1323 has been reduced, as compared to if the seat diameters were the same size, by roughly 40%.

In one advantageous embodiment, a piezoelectric actuator element (not shown) is substituted for the pneumatic actuator element. The poppets 1314, 1322 and the seats 1316 and 1322 are sized so that the needle 1327 is closed (i.e., in recirculating mode) when the actuator element is in its neutral, or de-energized state, or, in other words, the hydraulic section 1302 has a normally-closed delivery valve.

Figure 14:
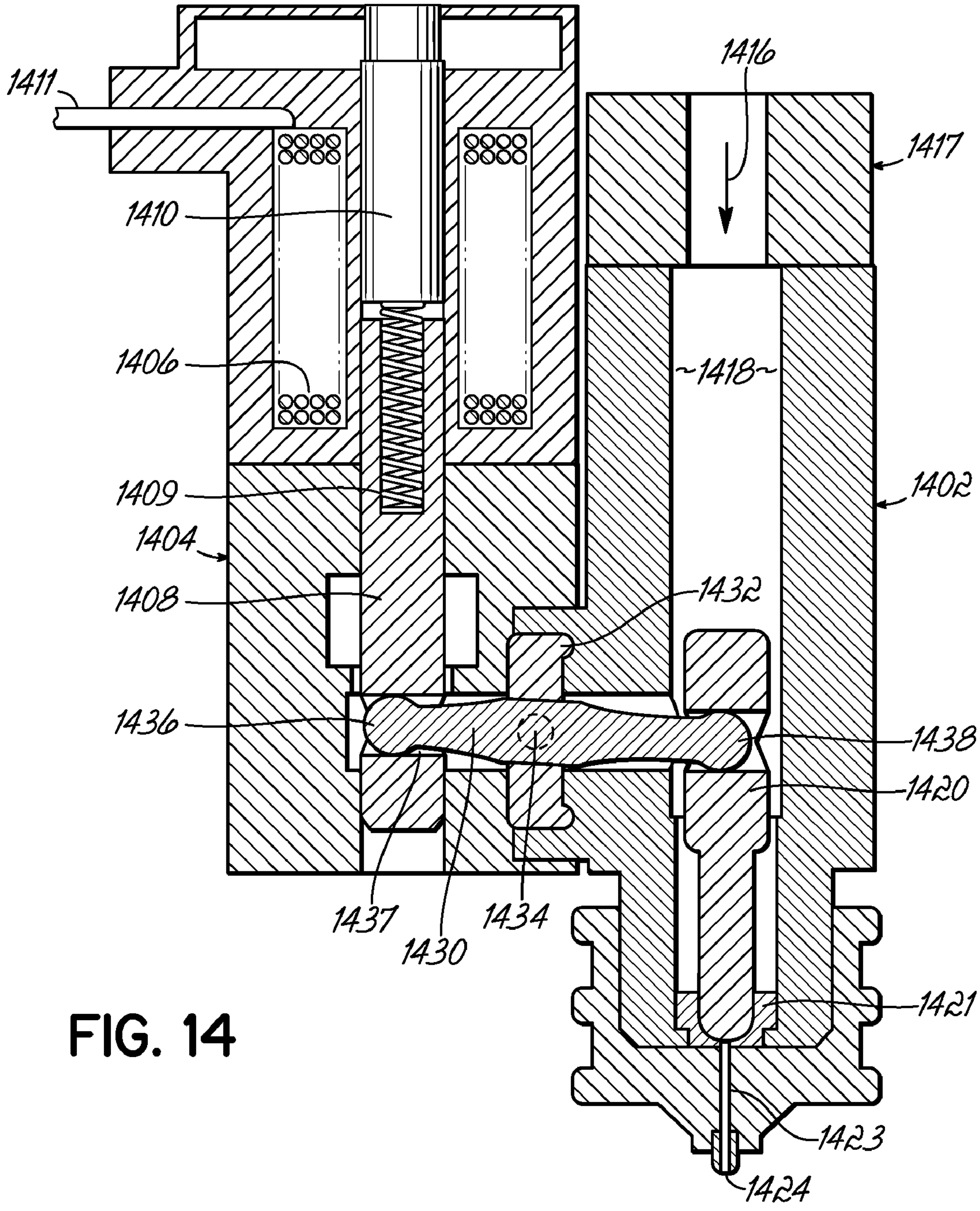
FIG. 14 illustrates a sectional view of an exemplary dispenser in accordance with the invention wherein the actuating section is configured as an electrical section.

The exemplary embodiments described above included a pneumatic section and a solenoid section that work together to move a piston within the pneumatic section via pressurized air. The present invention is not limited in its use and application to only such pneumatic sections. By way of example, FIG. 14 depicts a sectional view of an exemplary dispenser having a hydraulic section 1402 in a side-by-side manner with an electrical section 1404. The hydraulic section 1402 includes a chamber 1418 that receives pressurized liquid 1416 from manifold 1417. Within the chamber 1418 is a needle 1420 configured to engage valve seat 1421. When the needle 1420 engages the valve seat 1421, no pressurized liquid travels from the chamber 1418 through the passageway 1423 and out of the orifice 1424 of the nozzle 1422. However, when the needle 1420 is positioned so as not to engage the valve seat 1421, then pressurized liquid exits the chamber 1418 via passageway 1423.

The electrical section 1404 includes an electromagnetic coil 1406 disposed about an armature 1408 that is biased downward by a compression spring 1409. In operation, electrical current is supplied to coil 1406 by a power source (not shown) through electrical connector 1411, which generates an electromagnetic field between the armature 1408 and a pole 1410 so as to attract the armature 1408 to pole 1410. Since pole 1410 cannot move, the armature 1408 will move against the force of the spring 1409 until it hits the pole 1410.

The armature 1408 of the electrical section 1404 and the needle 1420 of the hydraulic section 1402 are operatively coupled together via pivoting lever arm 1430. The arm 1430 includes one end 1436 that couples to the armature 1408. For example, the end 1436 may be ball shaped and fit within a through-bore 1437 machined into the armature 1408. Similarly, the other end 1438 of the arm 1430 may couple with the needle 1420. The seal 1432 is located between the hydraulic section 1402 and the electrical section 1404 to prevent pressurized liquid 1416 from leaking into the electrical section 1404. The arm 1430 pivots around a pivoting point 1434, such as that defined by a pin, in this way, the downward motion of the armature 1408, such as when electrical current is shut off to coil 1406 and spring 1409 biases armature 1408 downward, results in upward motion of the needle 1420. Conversely, upward motion of the armature 1408, such as when electric current is supplied to coil 1406 and armature 1408 is attracted to pole 1410, results in downward motion of the needle 1420.

Those of ordinary skill in the art will appreciate that different configurations of the electrical section 1404 may be used in the invention. For instance, the electrical section 1404 may be modified such that the needle 1420 is normally closed when no electric current flows to coil 1406. Additionally, those of ordinary skill in the art will recognize that an electric actuator, such as electrical section 1404, may be used with the various embodiments of the hydraulic sections shown and described herein.

Alternatively, piezoelectric actuators (not shown) may be used as well that resemble the up-and-down motion of a piston. Such electrically actuatable pistons may be coupled with a pivoting lever arm similar to that described herein without departing from the scope of the present invention. As such, the electrical section (which replaces the pneumatic section) may be arranged in a side-to-side manner with the hydraulic section in order to provide the benefits and advantages described herein. The present invention also contemplates using hydraulic sections that include additional air inlets commonly labeled “process air”. Such air is separate from that of the pneumatic section and can be used, as one of ordinary skill would appreciate, to adjust the manner in which liquid is dispensed from the dispensing orifice.

While the present invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known.

What is claimed is:

1. A dispenser comprising:

a configurable actuating section that comprises a pneumatic actuating section and an electric actuating section, the pneumatic actuating section having a pneumatic moveable member and a pneumatic piston that moves the pneumatically moveable member, the electric actuating section having a electrically moveable member, and the electric actuating section configured to be supplied with electricity for use in moving the electrically moveable member; and a hydraulic section having a fluid inlet connected to a source of pressurized liquid, a chamber that receives the pressurized liquid from the fluid inlet, a valve seat within the chamber, an outlet, and a needle, the needle configured to be reciprocally moveable into and out of contact with the valve seat to control the dispensing of the liquid from the chamber through the outlet, wherein the hydraulic section is configurable to be alternatively coupled to the pneumatic actuating section or the electric actuating section, wherein when the hydraulic section is operatively coupled to the pneumatic actuating section, the pneumatically moveable member is operatively coupled to the needle for moving the needle into contact with the valve seat to control the dispensing of the liquid from the chamber through the outlet, and wherein when the hydraulic section is operatively coupled to the electric actuating section, the electrically moveable member is operatively coupled to the needle for moving the needle into contact with the valve seat to control the dispensing of the liquid from the chamber through the outlet.

2. The dispenser of claim 1 wherein the electrically moveable member is an armature.

3. The dispenser of claim 1, further comprising:

a fluid seal between the hydraulic section and the configurable actuating section.

* * * * *